Feb. 5, 1924.                                                    1,483,028
                          H. R. WALSH
                COUPLING FOR HOSE, PIPE, AND THE LIKE
                         Filed March 9, 1922
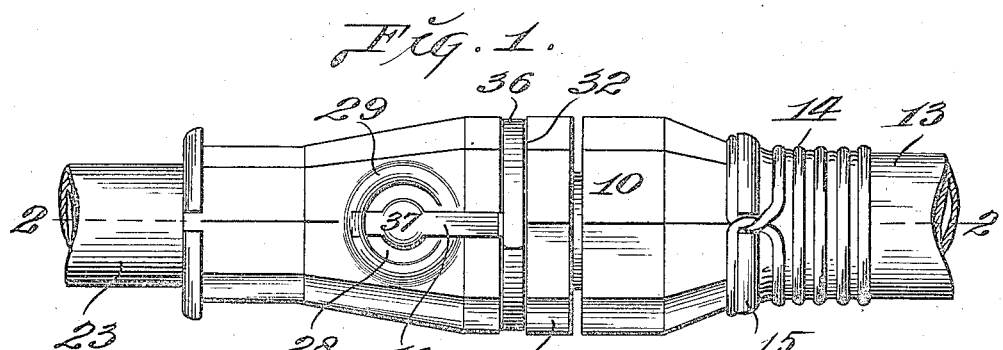
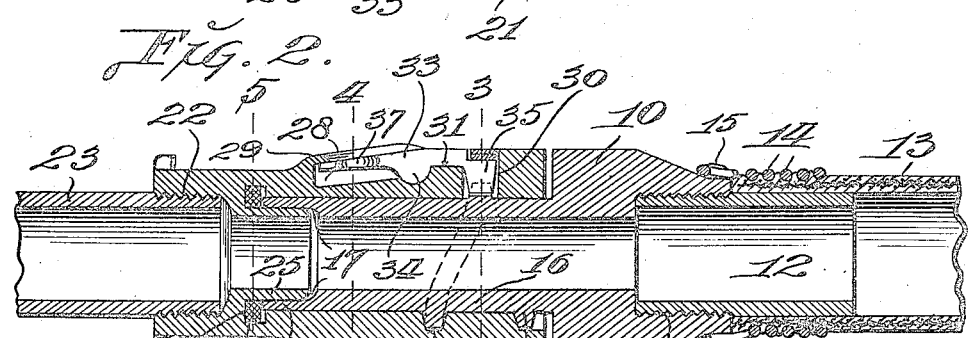
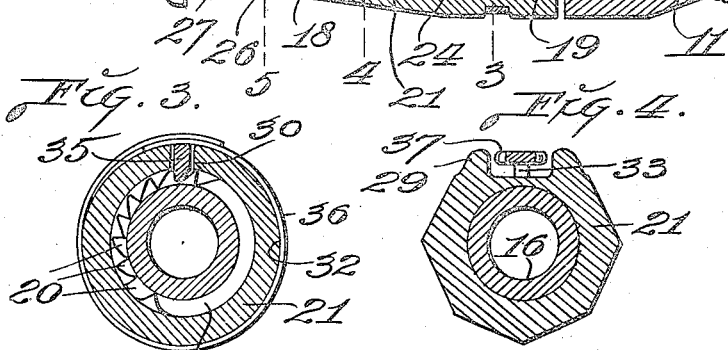 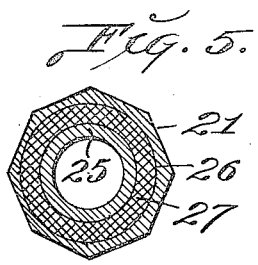
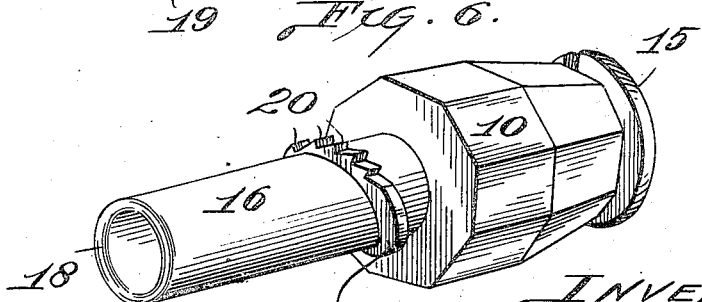
INVENTOR:—
Harry R. Walsh.
By Hazard & Miller
Attys.

Patented Feb. 5, 1924.

1,483,028

UNITED STATES PATENT OFFICE.

HARRY R. WALSH, OF SAN PEDRO, CALIFORNIA, ASSIGNOR TO WALSH AUTOMATIC COUPLING COMPANY, OF LOS ANGELES, CALIFORNIA, A CORPORATION OF CALIFORNIA.

COUPLING FOR HOSE, PIPE, AND THE LIKE.

Application filed March 9, 1922. Serial No. 542,275.

*To all whom it may concern:*

Be it known that I, HARRY R. WALSH, a citizen of the United States, residing at San Pedro, in the county of Los Angeles and State of California, have invented new and useful Improvements in Couplings for Hose, Pipe, and the like, of which the following is a specification.

My invention relates to a coupling for hose, pipe and the like, the principal objects of my invention being to provide a pipe or hose coupling that is "quick-acting" when the parts thereof are being connected or disconnected; to provide a coupling that is of relatively simple and practical construction, capable of being easily and cheaply produced; to provide the coupling with simple and efficient means for locking the principal parts of the coupling to each other when in coupled condition; and, further, to provide a coupling of the character described that is of strong, durable and compact construction.

With the foregoing and other objects in view, my invention consists in the features of construction and combination and arrangement of parts hereinafter more fully described and claimed, reference being had to the accompanying drawings, in which:

Figure 1 is a top plan view of a coupling of my improved construction;

Figure 2 is a longitudinal section taken on the line 2—2 of Figure 1;

Figure 3 is a cross section taken on the line 3—3 of Figure 2;

Figure 4 is a cross section taken on the line 4—4 of Figure 2;

Figure 5 is a cross section taken on the line 5—5 of Figure 2;

Figure 6 is a perspective view of the male member of the coupling.

Referring by numerals to the accompanying drawings, which illustrate a practical embodiment of my invention, 10 designates the main body portion of the male member of the coupling, which body is substantially tubular in form and provided at one end with an internal thread 11 that receives the externally threaded end of a nipple 12, which latter may be connected in any suitable manner to a pipe or hose section 13. Where a hose section is positioned on the projecting end of the nipple 12, it may be clamped thereupon in any suitable manner, preferably by means of wires 14 that are wrapped around that portion of the hose section that encloses the nipple, portions of said wire being wrapped around the adjacent end of the body 10 behind an annular flange 15 that is formed on said body 10, and no retaining ring being required the last mentioned wrapping being entirely exterior.

Formed integral with the body 10 is a concentrically arranged tubular extension 16, the end thereof being reamed as designated by 17 to form at the end of said tubular extension a relatively thin annular terminal portion 18. Formed on the tubular extension adjacent to the body 10 is a single spirally disposed thread 19 that extends substantially once around the circumference of said extension, and the pitch of said thread is approximately 20° to 25° relative to the axis of the tubular extension 16 and body 10. Formed in the outer face of this thread 19 and preferably adjacent to its end is a series of notches 20.

The female part of the coupling comprises a tubular body 21, one end of which is internally threaded as designated by 22 in order to receive a nipple or pipe section 23, which latter may be seated in the end of a flexible tube or hose. The greater portion of the opening through member 21 is of such a diameter as to snugly receive the tubular extension 16, and formed in said member 21 adjacent to the end that engages against the main body portion of member 10 is a spirally disposed groove 24 that receives the thread 19 when the parts are properly coupled.

Formed within the tubular member 21 and adjacent the inner end of thread 22 is an annular flange 25 that is concentrically arranged with respect to the axis of said tubular member 21, and when the parts of the coupling are properly assembled this flange fits snugly within the reamed out portion 17 at the end of tubular extension 16. Formed around the annular flange 25 adjacent to the point where the same unites with the body of member 21 is an annular recess 26, in which is seated a compressible packing ring or gasket 27, which latter is engaged by the rounded end of the terminal portion 18 of tubular extension 16.

Formed in the outer face of tubular member 21 and at a point intermediate its ends is a recess 28 that is surrounded by a slightly raised bead 29, and extending lengthwise of said tubular member from said recess to an opening 30 that is formed through the wall of member 21 is a shallow channel 31. Recess 30 communicates with the central portion of the spirally disposed groove 24 that receives the thread 19, and formed in the periphery of member 21 and intersecting the outer portion of aperture 30 is a shallow groove or channel 32. Occupying channel 31 and extending across the recess 28 is a protected latching member 33, the rear end of which occupies a portion of the recess that rests beneath the bead 20, and formed on the under side of the intermediate portion is a pivot in the form of an integral and imperforate depending lug 34 that bears in a corresponding recess that is formed in the bottom of channel 31. The forward end of this latching member is provided with a depending head 35 that extends downwardly through aperture 30, and said head is adapted to engage in the notches between the teeth 20 on thread 19. Occupying the groove 32 is a ring-shaped spring 36, tending to force said head inwardly into position between the notches 20. The rear portion of the latching member 33 or that portion within the recess 28 is widened slightly in order to form a substantially circular plate or button 37 that may be readily engaged by the thumb or finger when it is desired to depress the rear end of said protected latching member to permit the parts of the coupling to be disconnected.

In assembling the parts of my improved coupling, the extension 16 on body 10 is inserted in the tubular member 21 until the forward end of thread 19 engages in the outer ends of the spirally disposed groove 24, and by rotating either part of the coupling approximately one half turn the thread 19 enters the spirally disposed groove 24, thereby drawing the two parts of the coupling into engagement with each other or until the end of tubular member 21 engages against the shoulder between body 10 and its extension 16. As the parts of the coupling are thus drawn, the end of the terminal portion 18 of member 16 bears against the packing ring or gasket 27, consequently producing a fluid pressure tight joint between the coupling members. As the parts of the coupling are thus assembled, the head 35 on the forward end of member 33 will ride past certain of the teeth on thread 19, which action is facilitated by the inclination of said teeth and the inclination of the lower end of said head 35, and when the parts of the coupling have been properly connected the head 35 engaging behind one of the teeth on the thread will effectually prevent reverse rotation of either one of the coupling members and, consequently, prevents the coupling from becoming accidentally disconnected. To disconnect the coupling, it is only necessary to depress the rear end of member 33 so as to lift the head 35 and then reversely rotate the parts so as to entirely withdraw thread 19 from the groove 24.

A coupling of my improved construction is comparatively simple, may be easily and cheaply produced, may be quickly coupled or uncoupled, and when properly coupled is effectively locked against disconnection.

It will be noted that in my improved coupling the packing ring or gasket 27 is located in the annular recess 26 beneath the flange 25, and that when the annular portion 18 of tubular extension 16 is positioned around the annular member 25 said gasket is wholly protected from the fluid that passes through the coupling. Obviously such arrangement materially lengthens the life or period of service of the gasket, and an effective leak-proof joint is provided between the parts of the coupling. Further, such arrangement prevents the gasket from being blown out under high pressures, and it also prevents the gasket from being accidentally disengaged and lost from the member in which it is seated when the parts of the coupling are disconnected.

The parts of the coupling are constructed so that when they are tightly connected the end of the tubular extension 16 compresses the gasket to a certain extent, and such compression effectually prevents leakage of any air or fluid pressure past said gasket.

Another important feature of my invention is the formation of the thread 19, the same being in the form of a flat thread or a thread having a flat outer face, such construction providing the desired strength and stability of the entire structure.

It will be understood that minor changes in the size, form and construction of my improved coupling may be made and substituted for those herein shown and described without departing from the spirit of the invention, the scope of which is set forth in the appended claims.

I claim as my invention:

1. In a hose coupling, a pair of tubular members, a tubular extension on one of said members, which extension has threaded engagement with the other member, the thread between said members being notched, and a latching member arranged in an aperture extending lengthwise of one of said tubular members adapted to engage the notches in said thread to lock the parts of the coupling against disconnection, said latching means being pivoted upon an imperforate lug and secured by a ring.

2. In a hose coupling, a pair of substantially tubular members, a portion of one of which is inserted within the other, a packing ring arranged within the receiving member and against which the end of the inserted portion of the member engages when the parts are properly connected, the parts of the coupling having threaded engagement with each other, and means comprising a ring-shaped spring and a latch movable thereby for locking the parts of the coupling against reverse rotary movement.

3. In a hose coupling, a pair of tubular members, a tubular extension on one of said members, which tubular extension is adapted to enter the other member, there being a flat thread formed on said tubular extension and adapted to engage in a spirally disposed groove formed in the other member, and means comprising a ring-shaped spring and a latch for locking said tubular members together.

4. In a hose coupling, a pair of tubular members, a tubular extension on one of said members, which tubular extension is adapted to enter the other member, a flat thread formed on said tubular extension and adapted to engage in a spirally disposed groove formed in the other member, and means comprising a ring-shaped spring and a latch for engaging said thread to lock the parts of the coupling to each other.

5. In a hose coupling, a pair of tubular members having threaded engagement with each other, which threaded engagement is such that the parts may be quickly connected or disconnected, and means comprising a ring-shaped spring and a latch for positively locking said members to each other when connected.

6. In a hose coupling comprising two interfitting members, a male member provided with an upstanding thread having notches therein, a corresponding female member provided with a female thread in the form of a groove cut in the interior thereof, an aperture extending from the exterior of said member into said groove, and protected disengageable means positioned in a recess and extending through said aperture for locking said male and female members, in engagement, said disengageable means comprising a longitudinally mounted lever pivoted upon an integral imperforate lug and secured by resilient means.

7. In a hose coupling comprising two interfitting members, a male member provided with an upstanding thread having notches therein, a corresponding female member provided with a female thread in the form of a groove cut in the interior thereof, an aperture extending from the exterior of said member into said groove, and protected disengageable means positioned in a recess and extending through said aperture for locking said male and female members in engagement, said female member being also provided with an inner flange, with an annular chamber at the base of said flange, and with a gasket in said chamber so placed as to be engaged by said male member, said disengageable means comprising a longitudinally mounted lever pivoted upon an integral imperforate lug and secured by resilient means.

8. In a hose coupling comprising a female member provided with an internal thread and a male member corresponding, an inner annular flange of a radial depth greater than the thickness of the flange of the other member on said female member, there being a chamber at the base of said annular flange, and a gasket in said chamber so placed as to be engaged by a relatively thin annular terminal portion upon said male member.

9. A hose coupling comprising male and female members, to one of which a hose is attached, the last mentioned member being provided internally with a nipple and externally with an integral annular flange, said flange being adapted to permit a hose-wrapping element to be wrapped partially in front of it and partially behind it and entirely on the exterior.

In testimony whereof I have signed my name to this specification.

HARRY R. WALSH.